May 22, 1956        D. McDONALD        2,746,862

DEWAXING METHODS AND APPARATUS

Filed Sept. 5, 1952        2 Sheets-Sheet 1

INVENTOR.
Dan McDonald,
BY Brown, Jackson, Boettcher & Dienner.
Atty.

May 22, 1956  D. McDONALD  2,746,862
DEWAXING METHODS AND APPARATUS
Filed Sept. 5, 1952  2 Sheets-Sheet 2
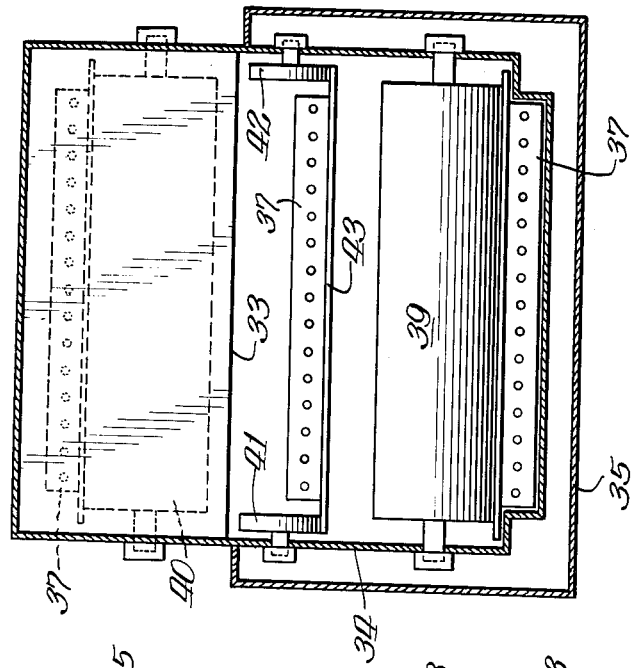
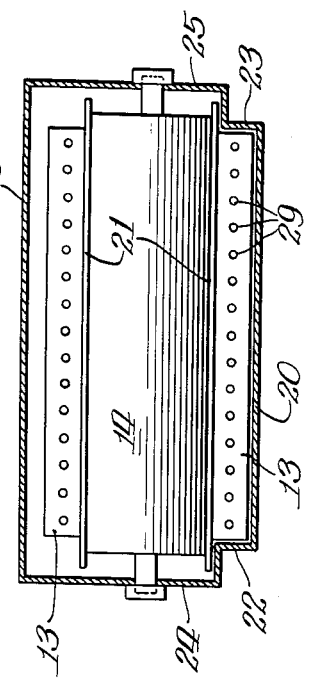
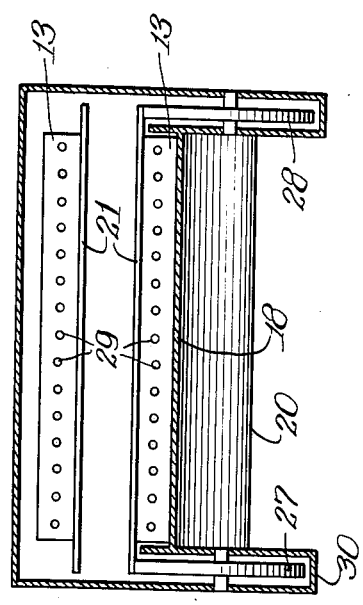
INVENTOR.
Dan McDonald,
BY
Brown, Jackson, Boettcher & Dienner.
Atty.

United States Patent Office 2,746,862
Patented May 22, 1956

2,746,862

DEWAXING METHODS AND APPARATUS

Dan McDonald, Aurora, Ill.

Application September 5, 1952, Serial No. 308,018

6 Claims. (Cl. 92—1.6)

This invention relates to processes and apparatus for the solvent extraction of wax and other substances from wax coated paper and other wax coated and wax impregnated materials.

One particularly important commercial application of the invention involves the salvaging of waste paper stock remaining from the manufacture of wax coated and impregnated bread wrappers, breakfast food box paper liners and paper containers for milk.

These wax coated papers are made from expensive high grade chemical pulp and in addition to the wax they may contain other material detrimental to re-processing of the stock into paper pulp, and ultimately into new paper. In addition to the wax there may be gums, rubber emulsions or various other solvent soluble additives, such as silicones or plastics. The re-use of the waste paper cuttings for re-pulping to be used in combination with new chemical pulp offers a possibility for important saving if satisfactory salvaging can be accomplished at a sufficiently low cost. For conciseness only, and not in a limiting sense, the specification will refer to such paper stock as the material being salvaged and all of the solvent soluble additives removed from the material will be considered as being referred to when comment is made about wax removal.

My invention, therefore, is directed broadly to the removal of the wax from wax coated papers in the sense indicated above.

One of the objects of the invention is to process the paper so that damage and loss of paper fiber is reduced to a minimum, and so that all of the wax recovered may be in such condition that it too may be re-used.

Another object and advantage of the invention lies in the fact that the invention is adaptable to continuous processing techniques and apparatus, and is preferably so practiced.

Other objects of the invention are to use a solvent for dissolving the wax, without appreciable loss of solvent, and to so arrange the process and apparatus as to conserve heat units.

Other objects and advantages of the invention will be mentioned hereinafter and will become apparent from the ensuing specification in which, for illustrative purposes, a presently preferred form of the invention is described.

In the drawings:

Figure 2 is a vertical sectional view, partly in elevation, on an enlarged scale, on line 2—2 of Fig. 1.

Figure 3 is a vertical sectional view, partly in elevation, on an enlarged scale on line 3—3 of Fig. 1.

Figure 4 is a vertical sectional view, partly in elevation, on an enlarged scale, taken on line 4—4 of Fig. 1.

Figure 1:
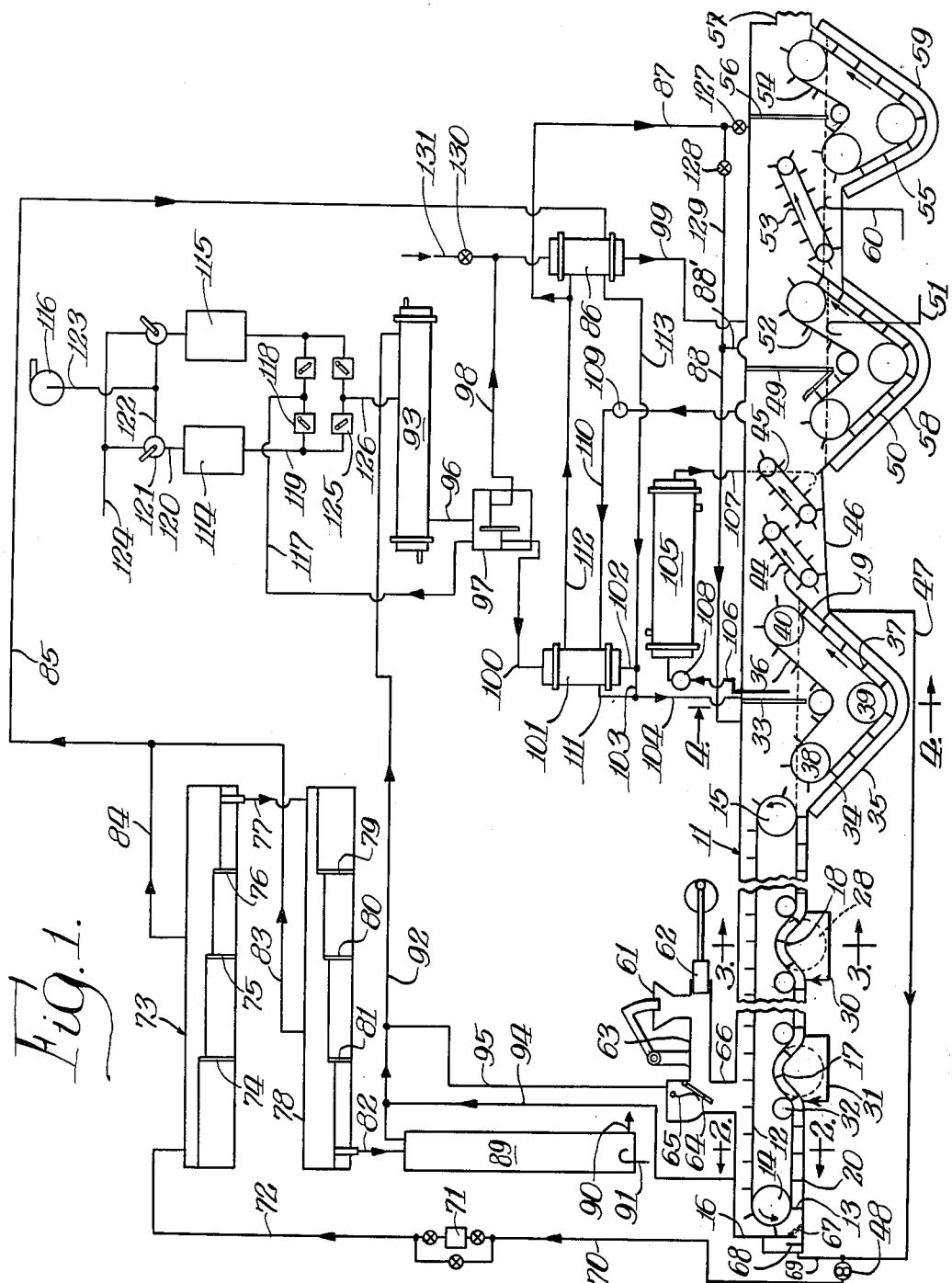
Figure 1 is a schematic flow diagram of the preferred form of the process.

Referring now to the drawings, Fig. 1 shows an elongated chamber, generally designated as 11, which may be constructed of steel plate and having a generally rectangular cross-section.

Extending longitudinally near one end of the chamber is an endless belt 12 which may be a perforated or wire screen type of belt having paddles 13 affixed thereto for propelling the waxed paper submerged through the solvent bath. This belt may be suspended on suitable rotatable drums 14 and 15 and driven continuously at slow speed by any suitable driving mechanism, not shown.

The belt 12 advances the paper scraps through three, or more, if desired, separated liquid solvent baths, the first extending from the end wall 16 to a dam 17, the second bath extending between dams 17 and 18, and the third from dam 18 to the inclined wall 19 which extends well above the solvent liquid level. This level should be well below the tops of the dams but high enough to submerge the lower traverse of the belt.

The dams 17 and 18 are upwardly curved portions of the bottom wall 20 of the tank 11. Transverse reinforcing members 21 incorporated in the screen wire belt have their ends extending over the lower side walls 22 and 23 (Fig. 2) to slide therealong, while the belt drums 14 and 15 are rotatably supported on the upper side walls 24 and 25. These walls are joined together as shown with top wall 26 to form a closed chamber from which solvent vapors and azeotrope vapors cannot escape, except through pipes provided for such purpose.

To assist in carrying the belt and its paddles over the dams disks 27 and 28 (Fig. 3) are rotatably mounted in side wall pockets, as shown, to engage the ends of the members 21, thus maintaining the paddles close to the dam surfaces without dragging thereon. As shown in Figs. 2 and 3 these paddles should have numerous perforations 29, or be made of wire mesh, so that as the paddles propel the paper cuttings up over the dam the solvent may drain quickly and thoroughly from the paper.

As it is intended that the solvent shall flow counter current to the movement of the paper, by-pass pipes 30 and 31 allow the solvent to advance from bath to bath around dams 18 and 17, in that order.

To assist in holding the belt submerged close to each dam in both the ascending and descending sides thereof idler rollers, such as 32, bearing on the top of the belt, are mounted in any suitable manner in the positions shown.

Fig. 4 together with Fig. 1, show the construction of a liquid trap mechanism which advances the paper scraps, under the vertical seal baffle 33, which dips a short distance into the solvent bath, thence upwardly and outwardly of the solvent bath up over the edge of the bath boundary wall 19. A well 34 is formed and has a heating jacket 35 to receive steam or other heating medium to aid in maintaining the solvent bath at a temperature above the azeotrope boiling point and a little below its boiling point.

The solvents, which may be employed in the process, will be discussed more fully hereinafter, but for the present and for illustrative purposes it will now be considered that the chlorinated hydrocarbon, perchlorethylene, is being employed. Its boiling point is about 250° F. and the water-perchlorethylene azeotrope boiling point is about 190° F. Hence, the solvent baths, for the sake of high efficiency, should be maintained at about 240° F. Some of the heat required may be derived from hot solvent vapors contacting the liquid solvent baths, and other heat may be furnished by conventional heating jackets or other means.

An endless belt 36 having transverse paddles 37 fixed thereon may be mounted substantially as shown on rollers 38, 39 and 40, rotatably supported in any suitable manner in the side walls of the tank, and may be driven in any appropriate or conventional manner by driving means not shown. Disk type rollers such as 41 and 42 rotatably supported in the tank side walls and engaging the ends of belt reinforcing member 43 may be employed to cause the belt and its paddles on its return run to pass freely under the liquid sealing baffle 33. Any other mounting and guide means for the belt, if suitable for the conditions, may be employed.

It may be here stated briefly that as the waxed paper moves through the three heated solvent baths its wax content dissolves into the solvent and any moisture present in the paper and in the air accompanying the paper is removed with some of the solvent as an azeotrope vapor, boiling at about 190° F. under the slight negative pressure existing in the tank to the left of baffle 33.

When the paper scrap, now free of wax, is lifted by belt 36 over the upper edge of wall 19, it falls upon the first of a series of paddle equipped inclined endless belts such as 44 and 45 which are suitably mounted and driven by means not shown. Belt 44 lifts the paper and drops it onto belt 45, while the latter lifts and drops it into the next well.

Most of the solvent freely drains from the paper as it passes up over the edge of wall 19, but any remaining free solvent which may drain from it will fall to the inclined chamber floor 46 and be drawn through pipe 47 into pump 48, which is later described. A superheated solvent vapor atmosphere is maintained in the chamber between the liquid seal baffle 33 and the seal baffle 49 for evaporating from the paper such solvent as still adheres to or has been absorbed by the paper. This function will be more fully discussed later. By maintaining the superheated vapor temperature high, for example, near 300° F., substantially all of the liquid solvent adhering to the paper will be vaporized before the belt 45 drops the paper into the water bath maintained in the deep well 50. Solvent remaining in the mass of paper scraps will be in the vapor phase and will be displaced by the water as the paper enters the water bath. If the water bath be maintained at a temperature range between 200 and 210° F., preferably near 200° F., water contacting solvent in or on the paper will cause some azeotrope vapor to be formed. Excess solvent vapor and azeotrope vapor are withdrawn from the zone between baffles 33 and 49 by means later described.

The water level in well 50 may be maintained by any suitable means such as by an overflow pipe 51 approximately as shown to keep the lower edge of baffle 49 immersed in the water but not high enough to overflow the end walls of the well. To convey the paper through this well underneath the baffle 49 and to discharge it drained of water onto the next conveyor belt there is provided an endless conveyor belt 52 which may be mounted, guided and driven similarly to belt 36, hence further description of it is not required.

Belt 52 drops the paper scraps upon an inclined conveyor belt 53 which carries the paper through an atmosphere of hot solvent vapor received from the later described solvent stills, this vapor supplying the heat required to form additional solvent-water azeotrope vapor, if there be any solvent yet remaining in or upon the paper as the latter emerges from the water bath in well 50.

Another endless belt 54 similar to belts 52 and 36 passing through the deep well 55 in association with the liquid seal baffle 56 dipping into the water bath in well 55 makes it possible to remove the paper from the solvent vapor atmosphere without loss of solvent. The paper, free of both wax and solvent, can then be discharged through channel 57 for repulping. Air or water jets or any suitable mechanical means (not shown) may be employed to discharge the paper from the paddles of belt 54 into the channel 57.

Wells 50 and 55 may be provided with conventional heating jackets such as 58 and 59 supplied with any desired heating medium. An overflow pipe 60 may be used to regulate the water level in well 55.

The wax coated and impregnated paper scraps are fed continuously into the dewaxing chamber by any appropriate means. As an example of such means, such a feeding device shown herein resembles a hay bailer, in having a feed spout 61 into which the paper scraps may be introduced in any desired manner ahead of a piston 62 reciprocated by any conventional driving mechanism, not shown. Each compression stroke of the piston will compact and advance a quantity of paper into the tube 63 against and past a pivoted gate 64 yielding against a stout spring 65, the compacted paper dropping through chute 66 into the dewaxing chamber on top of belt 12.

The paper is thereafter advanced through the hot solvent baths and through the three liquid seal wells as heretofore explained. The solvent is so introduced and withdrawn from the dewaxing chamber as to provide relative countercurrent movement of the solvent and the paper. The pump 48 continuously withdraws solvent containing dissolved wax through a screen 67 over the solvent level regulating baffle 68 through pipe 69 and delivers it into pipe 70 for passage through a conventional filter 71 and pipe 72 into a primary still 73. This still may be heated by any suitable means, not shown, to distill the solvent from the wax, as the miscella advances over the cascade baffles 74, 75 and 76 to an overflow pipe 77, which delivers the miscella to the secondary still 78, which also will have heating means for vaporizing solvent from the wax as the miscella advances over the cascade baffles 79, 80 and 81 to an overflow pipe 82. When perchlorethylene is the solvent, it boils off at about 250° F., and is withdrawn from the stills by pipes 83, 84 and 85 for passage through a heat exchanger 86 as a heating medium, the uncondensed portions being withdrawn from the heat exchanger 86 by pipe 87, some of this vapor being then introduced into the chamber between baffles 49 and 56 wherein solvent is being vaporized from the paper. Solvent vapor and solvent-water azeotrope vapor are drawn continuously from this chamber through pipe 88 and are delivered into the chamber to the left of baffle 33 due to the suction effect produced by the condenser and blower, later described.

Referring again to the solvent stills, their capacity and the rate of flow therethrough will be so determined that virtually all of the solvent is distilled from the miscella advancing over the cascade baffles. When the wax finally flows into the stripping column 89 only a minor steam stripping operation is required to strip the last vestiges of solvent from the wax, the wax then flowing to storage through pipe 90. Steam introduced through pipe 91 strips the solvent from the wax, forming an azeotrope vapor which is conducted by pipe 92 to a water cooled condenser 93.

Pipe lines 94 and 95 also deliver azeotrope vapor and solvent vapor through line 92 to the condenser 93, and the condensate therefrom flows by pipe 96 into a gravity separator 97 wherein the water and solvent separate readily because of their immiscibility and different specific gravities. The water is withdrawn by overflow pipe 98, passes through heat exchanger 86 and enters the desolventizer chamber through pipe 99.

The liquid solvent flows from gravity separator 97 through pipe 100 and through heat exchanger 101, lines 102, 103 and 104 into the solvent bath in the chamber.

The heater 101, the jacket 35 and the hot solvent vapors introduced into the dewaxing chamber, and other heating means if desired, are employed to maintain the solvent bath well over the azeotrope boiling point but under the solvent boiling point, for example, at about 240° F. if desired.

In the chamber between baffles 33 and 49 solvent vapor is being constantly recirculated through a steam heated superheater 105 by means of pipes 106 and 107 and a blower 108, to heat the vapor to perhaps as high as 300° F. to promote rapid vaporization of solvent from the paper being handled by conveyors 44 and 45.

Preferably the outlet end of pipe 107 is positioned as shown to discharge the superheated solvent vapor underneath the conveyor 45.

When the positive vapor pressure in this solvent vaporizing chamber exceeds a predetermined pressure, some solvent vapor will escape past a conventional back pressure valve 109 in pipe line 110, thus supplying hot solvent vapor to heat exchanger 101. Some of this superheated vapor will condense and be returned by pipes 111 and 104 to the solvent bath. The uncondensed vapor will be delivered by pipe 112 into the vapor return line 87. Condensate from heat exchanger 86 will be evacuated by pipe 113.

Associated with the gravity separator 97 and condenser 93 are a pair of carbon adsorbers 114 and 115, which, as will appear, may be operated simultaneously or alternately or both. An exhaust blower is employed to impose constantly a suction through either or both of the adsorbers and through the condenser upon the gravity separator. There will be some noncondensibles and some uncondensed solvent vapor constantly exhausted from the separator through pipe 117, through check valve 118, pipe 119, into adsorber 114, for example, by pipe 120, three-way valve 121, pipes 122 and 123 and the blower 116. The adsorber will adsorb the solvent, while the blower will discharge the non-condensibles to atmosphere. When this adsorber is saturated with solvent the three-way valve may be rotated to cut off suction from the blower and admit live steam from pipe 124 through the adsorber, stripping the solvent therefrom as an azetrope vapor, which will flow through pipe 119, check valve 125, and pipe 126 to the condenser, which will deliver condensed water and solvent to the separator 97. The use of the other adsorber and its associated connections will, no doubt, now be obvious.

The hand valves 127 and 128 may be so adjusted as to divert some of the solvent vapors being carried by pipe 87 into the chamber between baffles 49 and 56 and some into pipes 129 and 88. It should be noted that pipe 88 and 88' also evacuate both solvent and azetrope vapors aided by the negative pressure in line 94.

As the dewaxed paper being discharged from the apparatus will carry out more water than it brings into the system, a valve 130 and pipe 131 may be employed to supply water as needed.

For convenience, the term "miscella" may be employed in referring to the solvent and dissolved substances being delivered to the stills.

It should be recognized that the flow diagram of Fig. 1 is condensed for convenience of illustration, hence no inference as to relative sizes of the apparatus should be drawn therefrom.

Furthermore, while perchlorethylene is mentioned herein, other solvents may be employed, such as, for example, the following halogenated hydrocarbons including certain chlorinated hydrocarbons:

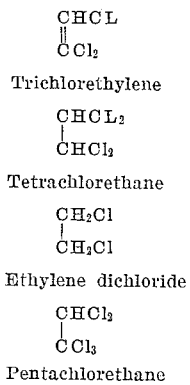

Trichlorethylene

Tetrachlorethane

Ethylene dichloride

Pentachlorethane and the following fluorinated hydrocarbons, identified by their formulae and boiling points:

|  | ° C. |
|---|---|
| $C_7F_{16}$ | 82 |
| $C_8F_{16}$ | 102 |
| n—$C_7H_2ClF_{11}$ | 95 |
| n—$C_7H_2Cl_2F_{10}$ | 115 |
| n—$C_7H_2C_3F_9$ | 142 |
| n—$C_7H_2Cl_2F_8$ | 135 |
| n—$C_7H_2F_{12}$ | 125 |
| $C_2Cl_4F_2$ | 91–92 |
| $C_3Cl_4F_4$ | 111.5 |
| $C_3HCl_4F_3$ | 127–129 |
| $C_3Cl_5F_3$ | 152 |
| $C_4HCl_3F_4$ | 109–110 |
| $C_5HCl_3F_6$ | 110–112 |
| $C_5HCl_2F_9$ | 81 |
| $C_5Cl_2F_6$ | 87 |

Except as indicated and specifically pointed out the entire chamber of Fig. 1 is sealed against the escape of solvent or azetrope vapors to the atmosphere. Hence, there will be no inadvertent loss of solvent by leakage to atmosphere, nor will an appreciable amount of the solvent be carried out of the process in the paper or wax.

Both of the water baths in wells 50 and 55 should be maintained at a temperature between the boiling point of the water and the water-solvent azetrope boiling point of the particular solvent being employed. In the case of perchlorethylene the limits of the range would be 190° F. to 212° F. but of course the bath temperature should not closely approach either limit when operating under commercial conditions. A temperature in the middle of the range, such as 200° F. is preferred. Thus, any solvent entering the water bath should be evaporated as an azetrope vapor, from which the solvent may be recovered, as explained heretofore.

The countercurrent movement of the paper and the flowing solvent baths during dewaxing contributes importantly to the thoroughness of the dewaxing operation. The first bath containing the highest concentration of wax is being continuously pumped to the stills while it receives solvent of lower wax concentration continuously from the second bath. The paper itself is drained of wax-rich solvent as it is lifted over dam 17. Again, the paper is drained of solvent while being lifted over dam 18 into the third solvent bath containing less wax.

Wax-free hot solvent is continuously fed into the deep well 34, hence the paper is finally washed by such solvent as it emerges from that well. Accordingly, by regulating the speeds of the relative countercurrent movements in a proper manner, as will now be obvious, the paper can be completely dewaxed and any liquid solvent adhering to it on the conveyors 44 and 45 should be substantially wax free.

In the chamber where conveyor 53 is located, instead of introducing solvent vapor as heretofore described, I may introduce steam to strip from the paper any residual solvent therein, the steam and solvent then forming an azetrope vapor which can be drawn off through pipe 88'.

The subsequent removal of solvent from the paper and the use of the water baths for purging of solvent and as a sealing mechanism all aid in preventing any appreciable loss of solvent from the process. These steps, subsequent to dewaxing, may be termed broadly as the solvent vaporizing steps.

The hydrocarbons listed above, that is, including both chlorinated and fluorinated hydrocarbons, may be referred to in the claims as halogenated solvents. The choice of any of these solvents for use in practicing the invention may depend upon various factors including such as availability, and cost.

While a preferred method and apparatus are herein described it should be understood that both are subject to modification without departing from the scope of the invention defined in the claims.

Having shown and described my invention, I claim:

1. In an apparatus for solvent extraction of wax from wax-containing paper, a chamber sealed from the atmosphere provided with a series of compartments each containing a liquid solvent bath, means for introducing solvent into the last of said series of compartments and conducting it for flow successively through the series in one direction, means for introducing said paper into the first of said compartment and moving it through said solvent baths countercurrent to the solvent flow, a solvent vapor compartment, means for draining the paper of solvent and moving it from said last compartment through said vapor compartment, means for superheating solvent vapor and flowing it in contact with said drained paper in said vapor compartment, means providing a water bath and a vapor seal adjoining said vapor compartment through which the paper may be removed from the vapor compartment, means for heating said water bath above the solvent-water azeotrope boiling point, means for moving said paper through said water bath and vapor seal, means for removing a miscella of wax and solvent from the first of the bath compartments and distilling the solvent therefrom for re-use in the apparatus, and means withdrawing vapors and non-condensibles from the chamber and vapor compartment and recovering the solvent therefrom.

2. In a continuous process for dewaxing wax-coated paper particles, the steps including continuously feeding the paper particles into and submerging them in a first bath and successively through a series of separated heated baths of halogenated hydrocarbon solvent selected from the group consisting of perchlorethylene, trichlorethylene, ethylene dichloride, tetrachlorethane and pentachlorethane, progressively separating the paper particles from the solvent of each bath before submerging them in the next succeeding bath, and separating them from the last bath of said series, introducing substantially wax-free solvent into the last of said series of baths and progressively advancing it from one bath to the next counter to the direction of travel of the paper particles whereby the wax concentration in the solvent baths progressively increases counter to the paper travel, vaporizing liquid solvent from the paper separated from the last bath by heating the paper and solvent with superheated solvent vapor, displacing adhering and absorbed solvent vapor from said superheated paper by passing the paper through a water bath having a temperature above the solvent-water azeotrope boiling point, and thereafter stripping residual solvent if any from the paper by forming therefrom a water-solvent azeotrope vapor and removing the same.

3. In a continuous process for dewaxing wax-coated paper, the steps including continuously submerging the paper into and passing it successively through a series of separated heated liquid baths of solvent selected from the group consisting of perchlorethylene, trichlorethylene, ethylene dichloride, tetrachlorethane and pentachlorethane, said baths being maintained in a chamber sealed from the atmosphere, maintaining the baths at a temperature between the water-solvent azeotrope boiling point and the solvent boiling point and maintaining an atmosphere above said baths in said chamber consisting of azeotrope and solvent vapors, lifting the paper successively from each bath through said atmosphere and draining solvent therefrom before feeding it into the next succeeding bath, continuously supplying fresh solvent to the last of the series of successive baths and causing solvent to flow from said last bath successively to the other baths counter to the progress of the paper, continuously withdrawing a solution of solvent and wax from the first bath in the series and recovering solvent and wax separately therefrom, continuously removing paper from the last bath without contact with air into a second chamber sealed from the atmosphere and draining solvent therefrom, vaporizing liquid solvent from the drained paper in said second chamber by contacting it with superheated solvent vapor, withdrawing the paper from said second chamber through a water seal maintained at a temperature between the azeotrope boiling point and the water boiling point and thereby stripping solvent vapors from the paper, and continuously withdrawing vapors from both chambers and recovering the solvent therefrom.

4. In a continuous process for dewaxing wax-coated paper, the steps including continuously submerging the paper into and passing it successively through a series of separated heated liquid baths of solvent selected from the group consisting of perchlorethylene, trichlorethylene, ethylene dichloride, tetrachlorethane and pentachlorethane, said baths being maintained in a chamber sealed from the atmosphere, maintaining the baths at a temperature between the water-solvent azeotrope boiling point and the solvent boiling point and maintaining an atmosphere above said baths in said chamber consisting of azeotrope and solvent vapors, transferring the paper successively from each bath into the next bath while draining solvent therefrom before feeding it into such succeeding bath, continuously supplying fresh solvent to the last of the series of successive baths and causing solvent to flow from said last bath successively to the other baths counter to the progress of the paper, continuously withdrawing a solution of solvent and wax from the first bath and recovering solvent and wax separately therefrom, continuously removing paper from the last bath through a liquid solvent seal into a second chamber sealed from the atmosphere and draining solvent therefrom, vaporizing liquid solvent from the dewaxed and drained paper in said second chamber by contacting it with superheated solvent vapor, and withdrawing the paper from said second chamber through a water seal maintained at a temperature between the azeotrope boiling point and the water boiling point and thereby stripping solvent vapors from the paper, and continuously withdrawing vapors from both chambers and recovering the solvent therefrom.

5. In a continuous process for dewaxing wax-coated paper, the steps including continuously submerging the paper into and passing it successively through a series of separated heated liquid baths of a halogenated hydrocarbon solvent, said baths being maintained in a chamber sealed from the atmosphere, maintaining the baths at a temperature between the water-solvent azeotrope boiling point and the solvent boiling point and maintaining an atmosphere above said baths in said chamber consisting of azeotrope and solvent vapors, lifting the paper successively from each bath through said atmosphere and draining solvent therefrom before feeding it into the next succeeding bath, continuously supplying fresh solvent to the last of the series of successive baths and causing solvent to flow from said last bath successively to the other baths counter to the progress of the paper, continuously withdrawing a solution of solvent and wax from the first bath and recovering solvent and wax separately therefrom, continuously removing paper from the last bath without contact with air into a second chamber sealed from the atmosphere and draining solvent therefrom, vaporizing liquid solvent from the dewaxed and drained paper in said second chamber by contacting it with superheated solvent vapor, and withdrawing the paper from said second chamber through a water seal maintained at a temperature between the azeotrope boiling point and the water boiling point and thereby stripping solvent vapors from the paper, and continuously withdrawing vapors from both chambers and recovering the solvent therefrom.

6. In a continuous process for dewaxing wax-coated paper, the steps including continuously submerging the paper into and passing it successively through a series of separated heated liquid baths of solvent selected from the group consisting of perchlorethylene, trichlorethylene, ethylene dichloride, tetrachlorethane and pentachlorethane, said baths being maintained in a chamber sealed from the atmosphere, maintaining the baths at a temperature between the water-solvent azeotrope boiling point and the solvent boiling point and maintaining an atmosphere above said baths in said chamber consisting of azeotrope and solvent vapors, lifting the paper successively from each bath through said atmosphere and draining solvent therefrom before feeding it into the next succeeding bath, continuously supplying fresh solvent to the last of the series of successive baths and causing solvent to flow from said last bath successively to the other baths counter to the progress of the paper, continuously withdrawing a solution of solvent and wax from the first bath and recovering solvent and wax separately therefrom, continuously removing paper from the last bath without contact with air into a second chamber sealed from the atmosphere and draining solvent therefrom, vaporizing liquid solvent from the dewaxed and drained paper in said second chamber by contacting it with superheated solvent vapor, and withdrawing the paper from said second chamber through a water seal maintained at a temperature between the azeotrope boiling point and the water boiling point and thereby stripping solvent vapors from the paper, and continuously withdrawing vapors from both chambers and condensing them and recovering the solvent therefrom, and purging to atmosphere through a carbon adsorber the noncondensible gases such as air accompanying said vapors.

References Cited in the file of this patent

UNITED STATES PATENTS

| | | |
|---|---|---|
| 1,284,647 | Gaynor | Nov. 12, 1918 |
| 1,431,553 | Wickey | Oct. 10, 1922 |
| 2,151,529 | Roberts | Mar. 21, 1939 |
| 2,187,208 | McDonald | Jan. 16, 1940 |
| 2,297,839 | Montgomery | Oct. 6, 1942 |
| 2,580,019 | Fenske | Dec. 25, 1951 |

OTHER REFERENCES

Paper Trade Journal, Feb. 24, 1938, page 169, "Removing the Paraffin From Paper Waste."